United States Patent
Hänisch

(10) Patent No.: US 11,168,604 B2
(45) Date of Patent: Nov. 9, 2021

(54) HOUSING, ESPECIALLY FOR AN EXHAUST SYSTEM OF AN INTERNAL COMBUSTION ENGINE OF A VEHICLE

(71) Applicant: Eberspächer Exhaust Technology GmbH, Neunkirchen (DE)

(72) Inventor: Jan Hänisch, Neuhausen (DE)

(73) Assignee: Purem GmbH, Neunkirchen (DE)

(*) Notice: Subject to any disclaimer, the term of this patent is extended or adjusted under 35 U.S.C. 154(b) by 0 days.

(21) Appl. No.: 16/860,545

(22) Filed: Apr. 28, 2020

(65) Prior Publication Data
US 2020/0340384 A1    Oct. 29, 2020

(30) Foreign Application Priority Data

Apr. 29, 2019 (DE) .............. 10 2019 110 947.7

(51) Int. Cl.
| | | |
|---|---|---|
| *F01N 13/18* | (2010.01) | |
| *F01N 3/28* | (2006.01) | |
| *F16L 9/17* | (2006.01) | |

(52) U.S. Cl.
CPC ........... *F01N 13/1888* (2013.01); *F01N 3/28* (2013.01); *F16L 9/17* (2013.01); *F01N 13/185* (2013.01);
(Continued)

(58) Field of Classification Search
CPC .......... F01N 13/1844; F01N 13/1888; F01N 13/1894; F01N 2450/18; F16L 9/17; F24F 13/0209
See application file for complete search history.

(56) References Cited

U.S. PATENT DOCUMENTS

| | | | | |
|---|---|---|---|---|
| 2,698,031 A | * | 12/1954 | Primich | ............ F16L 9/17 |
| | | | | 138/167 |
| 3,654,049 A | * | 4/1972 | Ausnit | ............ B65D 65/08 |
| | | | | 24/16 PB |

(Continued)

FOREIGN PATENT DOCUMENTS

| | | |
|---|---|---|
| CN | 108 223 083 A | 6/2018 |
| DE | 1942340 A1 | 3/1971 |

(Continued)

OTHER PUBLICATIONS

Machine translation of EP-0316595-A1, accessed Apr. 9, 2021. (Year: 2021).*

*Primary Examiner* — Jonathan R Matthias
(74) *Attorney, Agent, or Firm* — McGlew and Tuttle, P.C.

(57) ABSTRACT

A housing for an exhaust system of an internal combustion engine of a vehicle, includes at least two housing shell areas (12, 14) enclosing a housing interior (26) and connected to one another in a connection area (16). A first housing shell area (12) of the two housing shell areas has a first meshing formation (36) in the at least one connection area (16) and a second housing shell area (14) of the two housing shell areas has a second meshing formation (40) that meshes or can be caused to positive-lockingly mesh with the first meshing formation (36). The first meshing formation (36) includes at least one meshing opening (38) and the second meshing formation (40) includes at least one meshing strap (42) meshing with the at least one meshing opening (38) in association with the at least one meshing opening (38) of the first meshing formation (36).

15 Claims, 2 Drawing Sheets

(52) U.S. Cl.
CPC ...... *F01N 2450/18* (2013.01); *F01N 2450/20* (2013.01)

(56) References Cited

U.S. PATENT DOCUMENTS

| | | | |
|---|---|---|---|
| 3,765,329 A * | 10/1973 | Kirkpatrick | B41F 27/1262 |
| | | | 101/415.1 |
| 4,260,111 A * | 4/1981 | Menzel | A01G 25/02 |
| | | | 239/450 |
| 6,571,429 B2 * | 6/2003 | Yeh | A45F 5/00 |
| | | | 24/16 PB |
| 2013/0306184 A1 * | 11/2013 | Prischak | F16L 21/06 |
| | | | 138/119 |

FOREIGN PATENT DOCUMENTS

| | | | |
|---|---|---|---|
| DE | 29 09 535 A1 | 9/1980 | |
| DE | 87 15 289 U1 | 1/1988 | |
| DE | 10 2005 044376 A1 | 3/2007 | |
| DE | 102017108244 A1 | 10/2018 | |
| DE | 202018103710 U1 | 10/2019 | |
| EP | 0316595 A1 * | 5/1989 | ........... F01N 3/2853 |
| FR | 2914039 A1 * | 9/2008 | ............. F16J 15/061 |
| GB | 1261473 A | 1/1972 | |
| GB | 1 485 988 A | 9/1977 | |
| WO | 2008058765 A1 | 5/2008 | |

* cited by examiner

HOUSING, ESPECIALLY FOR AN EXHAUST SYSTEM OF AN INTERNAL COMBUSTION ENGINE OF A VEHICLE

CROSS REFERENCE TO RELATED APPLICATIONS

This application claims the benefit of priority under 35 U.S.C. § 119 of German Application 10 2019 110 947.7, filed Apr. 29, 2019, the entire contents of which are incorporated herein by reference.

TECHNICAL FIELD

The present invention pertains to a housing, especially for an exhaust system of an internal combustion engine of a vehicle.

TECHNICAL BACKGROUND

A housing configured with two half shells for an exhaust system of an internal combustion engine is known from DE 10 2017 108 244 A1. Each of the two half shells forms a housing shell area. The two half shells or housing shell areas are connected to one another in two connection areas and they can thus form an insulating housing arranged surrounding a component of an exhaust system, for example, a catalytic converter or the like.

In the two connection areas, each of the housing shell areas has a folded edge area bent in the direction outwardly away from a housing interior. The two housing shells are in contact with one another with these folded edge areas in each of the two connection areas. Crimped-over sections following one another in a housing longitudinal direction are formed at each folded edge area, so that the crimped-over sections provided in folded edge areas that are in contact with one another mesh with one another in the manner of teeth and produce a positive-locking connection between the two housing shell areas after they have been crimped over.

SUMMARY

An object of the present invention is to provide a housing, especially for an exhaust system of an internal combustion engine of a vehicle, in which two housing shell areas can be connected to one another in a stable manner with a compact configuration.

This object is accomplished according to the present invention by a housing, especially for an exhaust system of an internal combustion engine of a vehicle, comprising at least two housing shell areas, which enclose a housing interior and are connected to one another in at least one connection area, wherein a first housing shell area of the two housing shell areas connected to one another in the at least one connection area has a first meshing formation in the at least one connection area and a second housing shell area of the two housing shell areas connected to one another in the at least one connection area has in the at least one connection area a second meshing formation, which is or can be brought into a positive-locking meshing with the first meshing formation, wherein the first meshing formation comprises at least one meshing opening and the second meshing formation comprises in association with the at least one meshing opening of the first meshing formation at least one meshing strap meshing with the at least one meshing opening.

Stable connection of the two housing shell areas to one another is guaranteed by the provision of meshing straps, which mesh with meshing openings and establish a positive-locking connection in the process, without the outwardly projecting folded edge areas known from the state of the art having to be provided for this purpose. The positive-locking connection can thus be maintained without the complicated folding process.

To make it possible to establish the connection in a simple manner during the assembly of the two housing shell areas, it is proposed that the at least one meshing strap be positioned or be able to be positioned such that it meshes with the associated meshing opening from an outer side of the first housing shell area, which said outer side is oriented such that it faces away from the housing interior.

The positive locking, which guarantees a firm bond of the two housing shell areas, can be obtained in a simple and reliably acting manner in the manner of a locking connection by the at least one meshing strap comprising a first strap section, which is connected to the second housing shell area and passes through the associated meshing opening when the housing shell areas are connected to one another, and by comprising a second strap section, which adjoins the first strap section and extends behind the first housing shell area.

To make it possible to provide this positive-locking interaction involving an extending behind, it is proposed that the first strap section extend starting from a first connection area of the first strap section to the second housing shell area in the direction of the housing interior and that the second strap section extend starting from a second connection area of the second strap section to the first strap section approximately in the direction of the first connection area.

It is especially advantageous in this case if the first strap section has, starting from the first connection area, a greater length of extension than does the second strap section starting from the second connection area. The fact is taken into account hereby that the first strap section passes through the first housing shell area, for example, from the outer side, while the second strap section extends behind the first housing shell area, for example, on the inner side thereof, i.e., it does not pass through the meshing opening.

To provide the positioning of the second strap section, which positioned second strap section extends behind the first housing shell area, the first strap section and the second strap section may extend diverging with respect to one another starting from the second connection area when the first strap section passes through the associated meshing opening. For example, the two strap sections may provide an essentially V-shaped configuration of the meshing strap.

To make it possible, on the one hand, to pass a meshing strap through this associated meshing opening, but, on the other hand, to achieve the positioning of the second strap section, which positioning extends behind the first housing shell area, it is proposed that the first strap section and the second strap section be connected to one another in an elastically flexible manner in the second connection area or/and that the first strap section or/and the second strap section be configured in such an elastically flexible manner that the two strap sections can be moved towards one another to insert the meshing strap into the associated meshing opening and that when the meshing strap has been inserted into the associated meshing opening, the two strap sections assume such a positioning with respect to one another that the second strap section extends behind the first housing shell area on the inner side thereof that faces the housing interior.

For a stable connection of the two housing shell areas to one another, the first meshing formation may comprise a plurality of meshing openings following one another in the direction of a housing longitudinal axis, and the second meshing formation may comprise a plurality of meshing straps following one another in the direction of the housing longitudinal axis.

A defined contact of the two housing shell areas with one another can be supported by the first housing shell area having a first contact edge extending from a housing circumferential wall of the first housing shell area in the direction of the housing interior in the at least one connection area, or/and by the second housing shell area having a second contact edge extending from a housing circumferential wall of the second housing shell area in the direction of the housing interior in the at least one connection area.

A configuration of the housing according to the present invention, which saves installation space, may be supported by the at least one meshing opening of the first meshing formation being provided in the at least one connection area in a housing circumferential wall of the first housing shell area.

In the housing according to the present invention, the first housing shell area and the second housing shell area may be connected to one another, for example, in two connection areas extending essentially in the direction of a housing longitudinal axis. This means that each of the two housing shell areas may be configured in the manner of a half shell, which does not necessarily mean that the two housing shell areas must be identical to one another or have the same size.

The present invention further pertains to an exhaust system for an internal combustion engine, especially for a vehicle, comprising an exhaust gas treatment unit enclosed by a housing in accordance with one of the above claims.

The present invention will be described below in detail with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
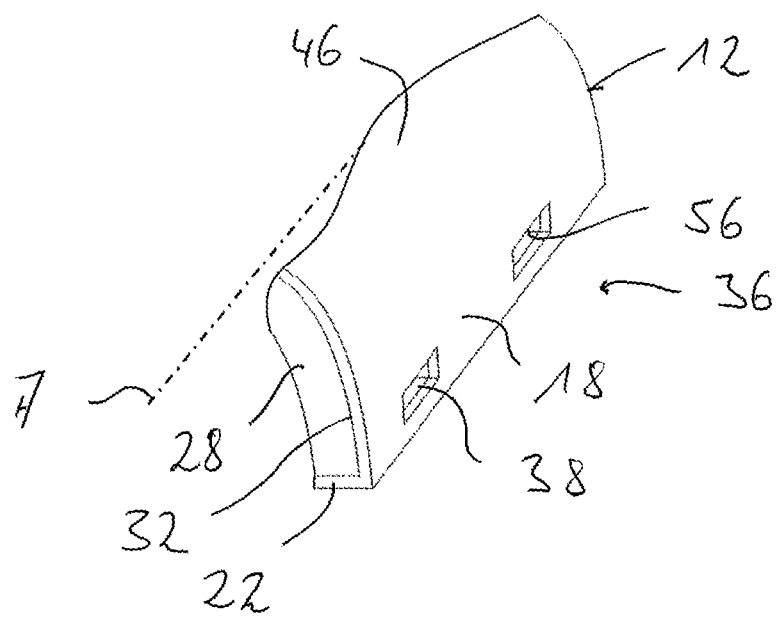
FIG. 1 is a cutaway perspective view showing a part of a first housing shell area of a housing for an exhaust gas treatment unit.
Figure 2:
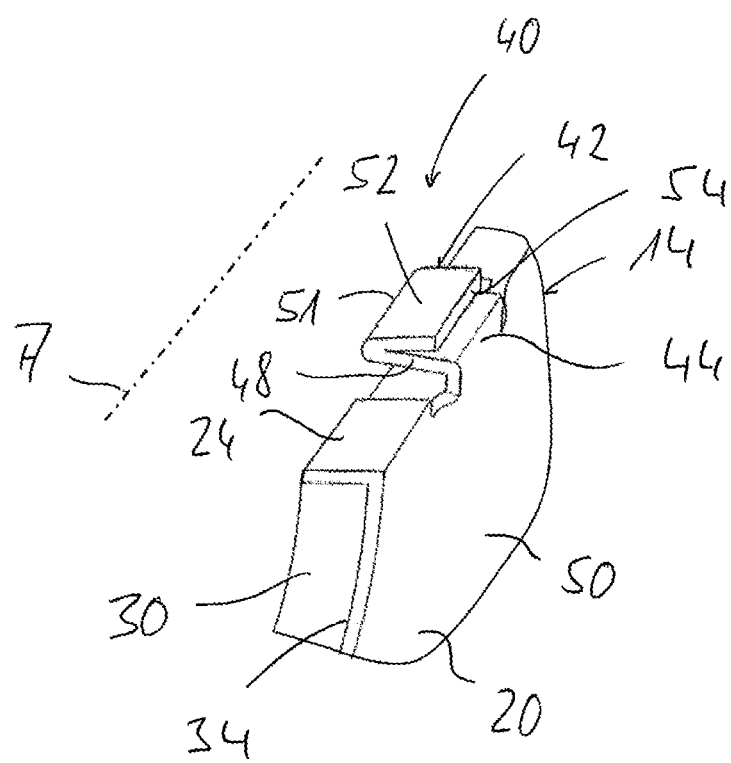
FIG. 2 is a cutaway perspective view showing a part of a second housing shell area to be connected to the first housing shell area for a housing of an exhaust gas treatment unit.
Figure 3:
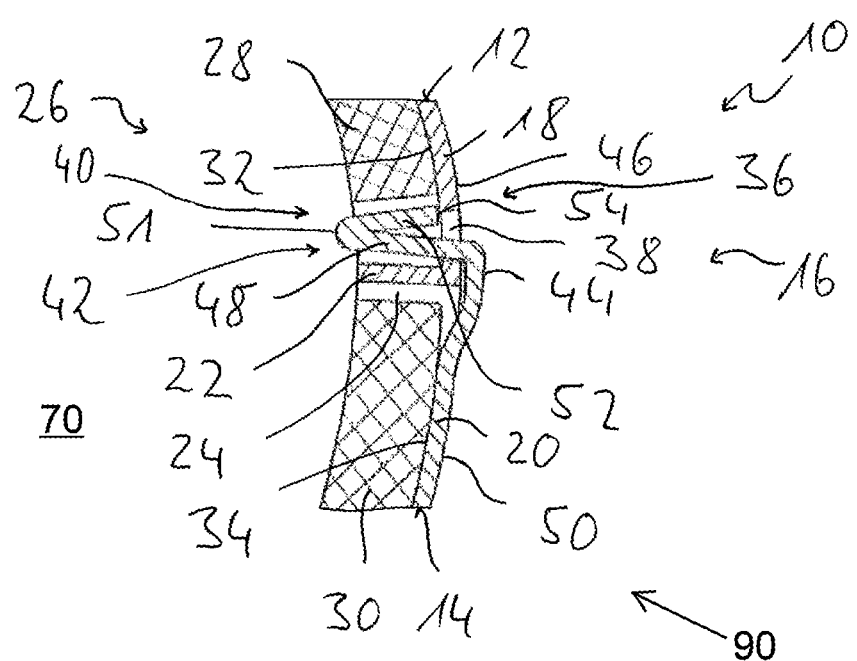
FIG. 3 is a sectional view of a portion of an exhaust system with an exhaust gas treatment unit and the two housing shell areas, which are shown in FIGS. 1 and 2 and which are connected to one another in a connection area.

Referring to the drawings, FIGS. 1 through 3 show parts of a housing, generally designated by 10, which may be arranged as an insulating housing enclosing an exhaust gas treatment unit 70 in an exhaust system 90 of an internal combustion engine of a vehicle. Such an exhaust gas treatment unit 70 may be, for example, a catalytic converter or the like.

The housing 10 comprises two housing shell areas 12, 14 shown in FIGS. 1 and 2. Each of these two housing shell areas 12, 14 may be configured such that it extends in the manner of a half shell in the direction of a housing longitudinal axis A and partially encloses same, so that the two housing shell areas 12, 14 are connected to one another in two connection areas for assembling the housing 10. The connection area 16 of these two connection areas can be seen in FIG. 3. Each of the two housing shell areas 12, 14 is formed, for example, from a sheet metal blank and has a housing circumferential wall 18, 20. Respective contact edges 22, 24 are bent off from the housing circumferential walls 18, 20 in the connection area 16 and preferably in each connection area in the direction of a housing interior 26 enclosed by the housing circumferential walls 18, 20. The contact edges 22, 24 extending towards the housing interior 26 are respective contact areas, with which the two housing shell areas 12, 14 can be in contact with one another in a stable manner.

Especially if the housing 10 shall be used as an insulating housing, respective insulating material 28, 30 may be provided on the inner side of the two housing shell areas 12, 14. This insulating material 28, 30 may be bonded, for example, to a respective inner side 32, 34 of the housing circumferential walls 18, 20 of the two housing shells 12, 14 by bonding or the like, but it may also be provided thereon, as an alternative, such that it is only in contact with it.

In order to make it possible to provide a firm connection of the two housing shell areas 12, 14, a first meshing formation generally designated by 36 is provided on the first housing shell 12. This first meshing formation 36 comprises in the housing circumferential wall 18 of the first housing shell 12 a plurality of meshing openings 38, which follow each other in the direction of the housing longitudinal axis A and are, for example, also elongated in this direction. As this is shown in FIGS. 1 and 3, the meshing openings 38 are provided in the area of the housing circumferential wall 18 adjoining the contact edge 22 of the first housing shell area 12.

A second meshing formation 40 is provided at the second housing shell area 14. This meshing formation 40 comprises, in association with the meshing openings 38 of the first meshing formation 36, a plurality of meshing straps 42 following one another along the housing longitudinal axis A. In particular, a meshing strap 42 of the second meshing formation 40 may be provided for each meshing opening 38 of the first meshing formation 36. The meshing straps 42 may have in the direction of the housing longitudinal axis A such an extension that they can be positioned in the direction of the housing longitudinal axis A such that they mesh essentially without clearance with the associated meshing openings 38. This means that the meshing straps 42 have essentially the same length of extension or a slightly shorter length of extension in the direction of the housing longitudinal axis A as the meshing openings 38 associated with these.

The meshing strap 42 that can be seen in FIGS. 2 and 3 is connected in a first connection area 44 to the housing circumferential wall 20 of the second housing shell area 14, and it is especially integral with same. The housing circumferential wall 20 may be deformed here in the first connection area 44 outwardly, i.e., in the direction away from the housing interior 26, so that the first connection area 44 can be positioned such that it extends over the housing circumferential wall 18 of the first housing shell area 12 on the outer side 46 thereof, which outer side faces away from the housing interior 26.

Adjoining the first connection area 44, the meshing strap 42 or each meshing strap 42 has a first strap section 48. The first strap section 48 extends starting from the first connection area 44 essentially straight in the direction of the housing interior 26, i.e., away from an outer side 50 of the second housing shell area 14. In an end area located at a distance from the first connection area 44, the first strap section 48 passes over into a second strap section 52 in a second connection area 51. Just like the first connection area 44, the second connection area 51 may also be obtained by deforming a sheet metal blank used to form the second housing shell area 14. The second strap section 52 extends starting from the second connection area 51, for example, essentially straight approximately in the direction of the first connection area 44, and, as this is clearly shown in FIGS. 2 and 3, the two strap sections 48, 52 assume positions that start from the second connection area 51 and diverge from one another. The two strap sections 48, 52 thus provide an essentially V-shaped form. The length of extension of the first strap section 48 between the first connection area 44 and the second connection area 51 is greater than the length of extension of the second strap section 52 starting from the second connection area 51. A free end area 54 of the second strap section 52 is thus offset in relation to the first connection area 44 or to the housing circumferential wall 20 of the second housing shell area 14 in the direction of the housing interior 26.

Based on fact that the second housing shell area 14 is made of a basically elastically deformable sheet metal material, the meshing strap 42 is elastically deformable in the area of the two strap sections 48, 52 and also in the second connection area 51. The two strap sections 48, 52 can thus be brought basically closer to one another in case of a corresponding action. If this action is eliminated, the two strap sections 48, 52 return again into their configuration diverging from one another, which is shown in FIGS. 2 and 3.

To connect the two housing shell areas 12, 14 in the connection area 16, the meshing straps 42 associated with the meshing openings 38 in the first housing shell area 12 are inserted from the outer side 46 of the first housing shell area 12 or of the housing circumferential wall 18 thereof into the respective meshing openings 38 associated with these. Since the meshing openings 38 have a smaller extension in the circumferential direction about the housing longitudinal axis A than the strap sections 48, 52 located in a V-shaped configuration with respect to one another, the second strap section 52 is moved during the insertion of a respective meshing strap 42 into a meshing opening 38 with its free end area 54 performing a sliding-off movement at an edge area 56 of the meshing opening 38 receiving same towards the first strap section 48. If the meshing strap 42 has been pushed completely into the associated meshing opening 38, so that the first strap section 48 is positioned from the outer side 46 such that it meshes with the meshing opening 38 or passes through same, the second strap section 52 is moved completely through this meshing opening, so that the edge area 56 releases the second strap section 52 again and this can spring back into its original position. The second strap section 52 extends in this state with its free end area 54 behind the housing circumferential wall 18 of the first housing shell area 12 on the inner side 32 thereof. A positive-locking connection of the two housing shell areas 12, 14 is thus produced in the manner of locking. Based on the second strap sections 52 of all meshing straps 42 meshing with associated meshing openings 38, which strap sections extend behind the housing circumferential wall 18 of the first housing shell area 12, separation of the two housing shell areas 12, 14 from one another is not possible, and a stable connection of these housing shell areas 12, 14 to one another is guaranteed.

In the circumferential direction, the two housing shell areas 12, 14 are in contact with one another in the connection area 16 or in each connection area having such a configuration via the contact edges 22, 24, which are directed inwards, i.e., towards the housing inner wall 26. Outwardly directed edge areas, which would be necessary, for example, for crimping over and for establishing thereby a positive-locking connection, are not provided in a housing 10 configured according to the present invention. A slight radial overhang is present only where the housing circumferential wall 20 of the second housing shell area 14 is slightly deformed outwards in order to be able to make possible the overlap that can be seen in FIG. 3 in the respective first connection area 44. This overhang could be eliminated by the second housing shell area 14 not being deformed outwards in the first connection area 44, but an inwards directed recess is present in an area of the first housing shell area 12, which said area corresponds to the first connection area 44, and the second housing shell area 14 can be positioned in said recess such that it dips into this recess with its respective first connection area 44, so that a flush course of the outer sides 46, 50 of the two housing shell areas 12, 14, which course is provided without projections to the outside, is provided over essentially the entire circumference.

Since the two housing shell areas 12, 14 are made of basically elastically deformable sheet metal material, it is also easily possible to connect these in the manner described with reference to FIG. 3 at connection areas located approximately opposite each other with respect to the housing longitudinal axis A. For example, the second housing shell area 14 can be connected for this purpose to the first housing shell area 12 first in one of the connection areas, after which the two housing shell areas 12, 14 are deformed radially with respect to the housing longitudinal axis A in the other of the two connection areas, so that the meshing straps 42 at the second housing shell area 14 can then be inserted from the outside into the associated meshing openings 38 at the first housing shell area 12.

After the meshing has been established, the meshing openings 38 provided in the first housing shell area 12 are closed almost completely by the meshing straps 42, which are positioned such that they mesh with these meshing openings 38, so that the entry of contaminants or of air flows leading to heat losses can also be prevented from occurring to the greatest extent possible.

It should finally be noted that the number of or the mutual distance between the meshing openings 38 and correspondingly also of the meshing straps 42 as well as the extension thereof especially in the direction of the housing longitudinal axis A may, of course, vary in case of such a connection of two housing shell areas to one another. For example, more meshing openings 38 and meshing straps 42 or/and meshing openings 38 and meshing straps 42 with larger dimensions may thus be provided and meshing openings 38 and meshing straps 42 located at shorter distances from one another may thus be arranged, for example, where especially high mechanical stresses are to be expected.

Due to the connection according to the present invention of two housing shell areas to one another, outwards projecting, sharp-edged areas are avoided. The connection of the two housing shell areas may be brought about by snapping in of the meshing straps, so that it is also unnecessary to carry out additional operations, e.g., the crimping over of sheet metal areas. Operations for preparing connections by connection in substance, e.g., by welding of the two housing shell areas, are also unnecessary. Each of the housing shell areas may be manufactured with the meshing formations to be provided thereon from a single piece of sheet metal by cutting out and subsequent shaping.

While the configuration according to the present invention of a housing or of the two meshing formations of the housing shell areas may be applied especially preferably if a connection area having these meshing formations is configured such that it extends essentially straight, for example, in the direction of a housing longitudinal axis, a curved contour of the connection area and hence a correspondingly curved course of the two housing shell areas in their areas with which they are in contact with one another, for example, in the contact edges, may, in principle, be provided as well. Adapted to the course of the connection area, the meshing openings and meshing straps may thus also be provided in a positioning or orientation following the curved course of the connection area.

While specific embodiments of the invention have been shown and described in detail to illustrate the application of the principles of the invention, it will be understood that the invention may be embodied otherwise without departing from such principles.

What is claimed is:

1. An exhaust system housing comprising:
   a first housing shell area with a first meshing formation; and
   a second housing shell area with a second meshing formation, wherein:
      the first housing shell area cooperates with the second housing shell area to at least partially enclose a housing interior;
      the first housing shell area is connected with the second housing shell area in a connection area;
      the first meshing formation positive-lockingly meshes with the second meshing formation;
      the first meshing formation comprises a meshing opening; and
      the second meshing formation comprises a meshing strap meshing with the meshing opening,
   wherein the meshing strap comprises:
      a first strap section connected to the second housing shell area and passing through the associated meshing opening with the housing shell areas connected to one another; and
      a second strap section adjoining the first strap section and extending behind the first housing shell area,
   wherein the meshing strap meshes with the associated meshing opening and meshes over an outer side of the first housing shell area, which outer side is oriented facing away from the housing interior,
   wherein:
      the first strap section extends starting from a first connection area of the first strap section to the second housing shell area in the direction of the housing interior; and
      the second strap section extends starting from a second connection area of the second strap section to the first strap section approximately in the direction of the first connection area.

2. The exhaust system housing in accordance with claim 1, wherein the first strap section has, starting from the first connection area, a greater length of extension than the second strap section starting from the second connection area.

3. The exhaust system housing in accordance with claim 1, wherein when the first strap section passes through the meshing opening, the first strap section and the second strap section extend diverging from one another starting from the second connection area.

4. The exhaust system housing in accordance with claim 1, wherein:
   the first strap section and the second strap section are elastically flexibly connected to one another in the second connection area and/or the first strap section or/and the second strap section are configured in an elastically flexibly such that the two strap sections are moveable towards one another for inserting the meshing strap into the meshing opening;
   with the meshing strap inserted into the meshing opening, the two strap sections are positioned in relation to one another such that the second strap section extends behind the first housing shell area on an inner side thereof, the inner side facing the housing interior.

5. The exhaust system housing in accordance with claim 1, wherein:
   the first meshing formation comprises the meshing opening and at least an additional meshing opening to provide a plurality of meshing openings following one another in a direction of a housing longitudinal axis; and
   the second meshing formation comprises the meshing strap and at least one additional meshing strap to provide a plurality of meshing straps following one another in the direction of the housing longitudinal axis.

6. The exhaust system housing in accordance with claim 1, wherein:
   in the connection area, the first housing shell area has a first contact edge extending from a housing circumferential wall of the first housing shell area in the direction of the housing interior; or
   in the connection area the second housing shell area has a second contact edge extending from a housing circumferential wall of the second housing shell area in the direction of the housing interior; or
   in the connection area, the first housing shell area has a first contact edge extending from a housing circumferential wall of the first housing shell area in the direction of the housing interior and the second housing shell area has a second contact edge extending from a housing circumferential wall of the second housing shell area in the direction of the housing interior.

7. The exhaust system housing in accordance with claim 1, wherein in the connection area the meshing opening of the first meshing formation is provided in a housing circumferential wall of the first housing shell area.

8. The exhaust system housing in accordance with claim 1, wherein the first housing shell area and the second housing shell area are connected to one another in two connection areas extending essentially in a direction of a housing longitudinal axis.

9. An exhaust system for an internal combustion engine, the exhaust system comprising:
   an exhaust gas treatment unit; and
   a housing enclosing the exhaust gas treatment unit, the housing comprising:
      a first housing shell area with a first meshing formation; and
      a second housing shell area with a second meshing formation, wherein:

the first housing shell area cooperates with the second housing shell area to at least partially enclose a housing interior;

the first housing shell area is connected with the second housing shell area in a connection area;

the first meshing formation positive-lockingly meshes with the second meshing formation;

the first meshing formation comprises a meshing opening; and the second meshing formation comprises a meshing strap meshing with the meshing opening, wherein the meshing strap comprises:

a first strap section connected to the second housing shell area and passing through the associated meshing opening when the housing shell areas are connected to one another; and a second strap section adjoining the first strap section and extending behind the first housing shell area, wherein the meshing strap meshes with the associated meshing opening and meshes over an outer side of the first housing shell area, which outer side is oriented facing away from the housing interior, wherein:

the first strap section extends starting from a first connection area of the first strap section to the second housing shell area in the direction of the housing interior; and the second strap section extends starting from a second connection area of the second strap section to the first strap section approximately in the direction of the first connection area.

10. The exhaust system in accordance with claim 9, wherein the first strap section has, starting from the first connection area, a greater length of extension than the second strap section starting from the second connection area.

11. The exhaust system in accordance with claim 9, wherein when the first strap section passes through the meshing opening, the first strap section and the second strap section extend diverging from one another starting from the second connection area.

12. The exhaust system in accordance with claim 9, wherein:

the first strap section and the second strap section are elastically flexibly connected to one another in the second connection area and/or the first strap section or/and the second strap section are configured in an elastically flexibly such that the two strap sections are moveable towards one another for inserting the meshing strap into the meshing opening;

with the meshing strap inserted into the meshing opening, the two strap sections are positioned in relation to one another such that the second strap section extends behind the first housing shell area on an inner side thereof, the inner side facing the housing interior.

13. The exhaust system in accordance with claim 9, wherein:

the first meshing formation comprises the meshing opening and at least an additional meshing opening to provide a plurality of meshing openings following one another in a direction of a housing longitudinal axis; and the second meshing formation comprises the meshing strap and at least one additional meshing strap to provide a plurality of meshing straps following one another in the direction of the housing longitudinal axis.

14. The exhaust system in accordance with claim 9, wherein:

in the connection area, the first housing shell area has a first contact edge extending from a housing circumferential wall of the first housing shell area in the direction of the housing interior; or in the connection area the second housing shell area has a second contact edge extending from a housing circumferential wall of the second housing shell area in the direction of the housing interior; or in the connection area, the first housing shell area has a first contact edge extending from a housing circumferential wall of the first housing shell area in the direction of the housing interior and the second housing shell area has a second contact edge extending from a housing circumferential wall of the second housing shell area in the direction of the housing interior.

15. An exhaust system housing comprising:

a first housing shell with a first formation, said first formation defining a meshing opening;

a second housing shell with a second formation, said second formation including a meshing strap meshing with the meshing opening, said first formation positive-locking with said second formation, said first and second housing shells being configured to define a housing interior when said first and second formations are connected;

said meshing strap includes a first strap section with one end connected to said second housing shell, said first strap section passing through said meshing opening from said one end to another end from a position radially outside said first shell in a direction of said housing interior to connect said first and second housing shells to one another, said meshing strap includes a second strap section with one end connected to said another end of said first strap section, said second strap section extends from said one end of second strap section away from said housing interior.

* * * * *